June 6, 1939. J. A. C. YULE 2,161,399
PHOTOMECHANICAL COLOR REPRODUCTION
Filed April 22, 1937
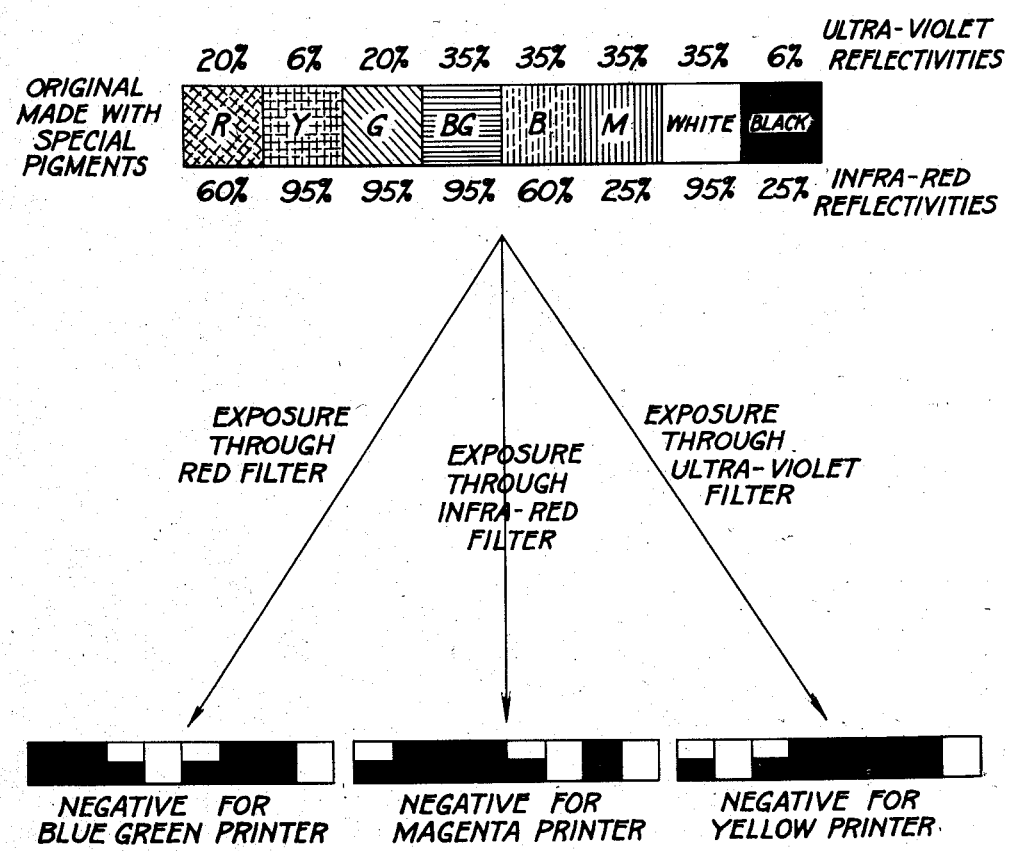
John A. C. Yule
INVENTOR
BY
ATTORNEYS Patented June 6, 1939

2,161,399

UNITED STATES PATENT OFFICE 2,161,399

PHOTOMECHANICAL COLOR REPRODUCTION

John A. C. Yule, Rochester, N. Y., assignor to Eastman Kodak Company, Rochester, N. Y., a corporation of New Jersey Application April 22, 1937, Serial No. 138,349

10 Claims. (Cl. 95—2)

This invention relates to photographic reproduction in color and more particularly to improvements in color reproduction by a photomechanical process whereby accurate results can be obtained more conveniently than is possible with the processes at present known.

In photo-mechanical color process work, a multi-color original to be reproduced is photographed through appropriate filters upon a series of sensitive plates to provide color separation images from which the finished plates are prepared in any well-known manner. In commercial work, the multi-colored original usually consists of a sketch made by an artist, a color photograph comprising superimposed dye-images or a color photograph made by a screen process.

By way of example, a color sketch made by an artist will be considered here. It is well known that the color separation images obtained from a sketch made with standard palette coloring materials will not produce in the final print correct color rendition even with the best contemporary printing inks. In practice, this deficiency which is mainly due to the inefficiencies of the inks, is generally combated by retouching the photographs and working the plates, which practice requires highly skilled artisans, and is both costly and time consuming.

It has been proposed to modify the colors of the original sketch by applying dyes on the surface or on a superimposed film, so as to falsify their visual values and reflecting powers in such a manner as to compensate for the deficiencies in the process. However, this is merely a method of interposing hand retouching at a different point in the reproduction process. This and other related correcting methods place a great burden upon the artist and the purchaser by distorting the visual appearance of the sketch so that they must think in terms of one color value and paint or observe a different color value. One method proposed by Murray in United States Patent 2,008,290, suggests a process in which the original sketch is corrected without handicapping the artist or appreciably distorting the visual appearance of the sketch, by incorporating fluorescent materials in the coloring materials used in creating the original sketch and making the color separation images partly by fluorescent light.

It is an object of my invention to provide special coloring materials for creating an original to be reproduced by a photo-mechanical process.

Another object of my invention is to provide a method whereby corrected color separation images may be made from originals created with the special coloring materials of my invention.

It is still another object of my invention to provide a colored original suitable for reproduction by a photo-mechanical process in which the color separation images, from which the usual blue green, magenta and yellow printers may be made, are made by exposing through red, infrared and ultra-violet filters.

Other objects and advantages of my invention will appear from the following description and its novel features are pointed out in the appended claims.

The accompanying drawing illustrates one embodiment of the invention.

For clarity, some of the terms used throughout this specification and in the appended claims will now be defined.

A red filter is one which transmits red light and, therefore, appears red. The spectral region included as primary red cannot and need not be exactly defined but is well known to those skilled in color photography. The terms, blue filter, green filter, ultra-violet filter, and infrared filter, may be similarly defined. A yellow filter is one which transmits both red and green light and absorbs the blue region of the spectrum. The terms, minus-red, minus-green, and minus-blue, may be used interchangeably with the terms, blue-green, magenta, and yellow, except when applied to the color of inks. For example, the magenta printing ink may not be a pure and complete minus-green, and, hence, a certain amount of color correction may be necessary when such inks are used. It is well known that the blue color which is produced by mixing magenta and blue-green inks has a decidedly purple hue and differs thus from primary blue. It is sometimes called blue-violet.

Many of those engaged in color press-printing employ the terms, "blue-printer, red-printer, yellow-printer," to mean the separation images to which the present specification refers as "blue-green printer, magenta printer, and yellow printer." This latter convention is adopted here so that no confustion will arise either between the colors applying to the negatives and the colors of the light filters used or between the terms used in this specification and those employed in various branches of color photography and ordinary color press-printing.

The term, "photographic," is here used in a broad sense so that "photographic layer," includes not only the silver halide type but also many similar materials such as those used as photo-sensitive resists.

This invention is primarily concerned with three color press-printing, and, hence, the term, "color separation negative," refers to the negatives used in making the blue-green printer, magenta printer, and the yellow printer. It is not used in the broad sense to include a negative from which the so called "black-printer" may be made. However, it is to be understood that my invention may be applied to the making of the three color printers in a four color process. In this case, the black printer may be made by any of the known methods which do not use the invisible portions of the spectrum. In fact, as will be pointed out later, certain embodiments of my invention permit the making of a black printer even by such methods.

The term, "coloring material," is used herein to include a pigment, ink, dye or similar material. As is well known, the following coloring materials reflect or transmit primary red light almost completely and do not require blue-green pigments or inks for their reproduction: "magenta, red, and yellow." The following require no magenta pigments for their reproduction: "yellow, green, blue-green." The following require no yellow ink for their reproduction: "blue-green, blue, and magenta." A coloring material, such as an ink, when printed in its maximum concentration in a continuous tone image or when printed as an unbroken area in a halftone image is said to be printed as a "solid tone."

According to one embodiment of my invention, a color sketch or photograph is created using a set of coloring materials having predetermined reflectivities or transparencies in the ultra-violet and infrared regions of the spectrum. As will be pointed out below, this sketch or color photograph is particularly suitable to be reproduced using a different set of coloring materials such as a set of commercial inks. In the above connection, the only infrared and ultra-violet regions which are of interest, are those to which photographic materials can be made sensitive.

According to this embodiment of the invention the coloring materials which require no yellow ink for their reproduction are chosen or have other materials incorporated in them so that their ultra-violet reflectivities are high and equal. The coloring materials which require a solid tone of the yellow ink in their reproduction are chosen so that they highly and equally absorb ultra-violet. The coloring materials which require intermediate amounts of yellow have correspondingly intermediate ultra-violet absorption power. When only three subtractive color coloring materials are used to create the original namely a yellow, a magenta and a blue green pigment, obviously none of them require such an intermediate ultra-violet absorption power. As will be pointed out later, any foreign materials which are incorporated in the coloring materials to give them the desired properties should themselves be practically invisible, i. e., should have uniform and high reflectivity throughout the visible spectrum range.

The materials which require no magenta ink in their reproduction are chosen or have materials incorporated in them so that they highly and equally reflect infrared. Those which require a solid tone of magenta ink in their reproduction are chosen or compounded so that they absorb infrared highly and uniformly. As will be apparent from the following description, only the relative, rather than the absolute, reflectivity and absorption are of interest when opaque coloring materials are used. However, when transparent pigments or dyes are employed, it is necessary that the ultra violet transmissions be practically complete; for example those transmitting blue light have an ultra-violet transmission of over 95%. Otherwise, variations in the amounts of these pigments would appear as variations in the yellow printer. This point will be discussed in connection with the method of employing these coloring materials.

In accordance with my newly invented method, a colored sketch or photograph is created using these coloring materials and color separation images are made therefrom by successively exposing three photographic plates or films to the red, infrared, and ultra-violet respectively, reflected from or transmitted by this original. The color separation images obtained thereby correspond to the ones usually obtained by exposing through a red filter, a green filter and a blue filter respectively. However, the ones made according to my invention need little, if any, further correction.

Thus, according to one embodiment of my invention, a palette of opaque artists' colors is made up having predetermined reflectivities in the ultra-violet and infrared regions, so that the deficiencies, which occur when a colored sketch created from these pigments is photographed by reflected light through red, green and blue filters in a photo-mechanical color process, are eliminated or greatly minimized by making the corresponding color separation images through red, infrared and ultra-violet filters respectively.

As is well known, a picture having a wide and almost complete range of colors can be created from a palette of three pigments, namely: magenta, yellow, and blue-green (sometimes known as red, yellow, and blue). Some artists prefer to use a palette consisting of six or even many more pigments, especially when the medium carrying the pigments is such that it is inconvenient and difficult to blend the separate ones, but for purposes of describing my invention it will suffice to consider only the case of three pigments, and to consider that the other pigments are made up from these three. It will be apparent that the principle and method disclosed are applicable in special cases to the use of three similarly colored dyes which are suitable for employment in the making of a color photograph comprising three superimposed dye images. However, as pointed out above, errors which are absent when opaque pigments are used, are introduced unless these transparent pigments or dyes, which according to the invention reflect or transmit the ultra-violet and infrared regions, do so completely. These errors are due to the obvious fact that any transparent material whose ultra-violet absorption is neither very large nor very small, cannot exhibit a uniform ultra-violet transmission or reflectivity when the amount employed is liable to vary over an effectively wide range. On the other hand, the opacity of opaque materials eliminates the effects of all layers and surfaces except the outermost one.

One specific palette of opaque artists' colors which I have found to be useful in this connection consists of the following three mixed pigments:

*Yellow.*—Hansa yellow, titanium oxide, zinc oxide.
*Magenta.*—Permanent Geranium Lake, Rhodamine Lake, cupric phosphate, white lead.
*Blue-green.*—Peacock blue lake, white lead, zinc oxide.

Each of the three mixed pigments is compounded in such a way that they match the three printing inks to be employed in reproducing a sketch made from these pigments, when such inks are printed as a solid tone.

As pointed out above, the pigments which do not require yellow ink for their reproduction (i. e., magenta and blue-green) are compounded in accordance with this embodiment of my invention to have equal and high ultra-violet reflectivity. The highest ultra violet reflectivity obtainable with these particular pigments is about 35% being limited by the reflectivity of the permanent Geranium Lake. By varying the percentage of zinc oxide in the above samples, the magenta and blue-green pigments are compounded to have equal ultra-violet reflectivity (approximately 35%). The above yellow pigment is compounded to have a relatively low ultra-violet reflectivity of about 6%. I have found that the ultra violet reflectivity may be controlled without affecting the visual appearance by varying the relative proportion of white lead, titanium oxide and zinc oxide which respectively have very high, medium and very low ultra violet reflectivities. These white fillers also give the pigments the desired opacity. Also the white card or canvas on which the sketch is to be painted must have an ultra-violet reflectivity approximately 35%. It will be noted that the residual 65% absorption of such a white base will be added to the absorption of the pigment, unless opaque pigments are used as in the present case. If a black pigment is used, it should absorb ultra-violet light equally to the yellow (i. e., have a reflectivity of 6%).

Also as pointed out above, the pigments which require no magenta ink in their reproduction (i. e., yellow and blue-green) must be selected or compounded to have high and equal infrared reflectivity. The above listed pigments reflect about 95% of incident infrared radiation. I have found that cupric phosphate can be used as an infrared absorbing pigment and, hence, I have added it to the magenta pigment to give an infrared reflectivity of about 25% which is relatively low (as desired). Other infrared absorbing pigments which reflect highly and uniformly throughout the visible spectrum may alternatively be employed in this connection. Actually, cupric phosphate absorbs some of the red as well as the infrared, which does not affect the operation of my invention but rather reduces slightly the range of colors which the artist is able to create with these pigments. In order to allow the artist as wide a range as possible, I refrain from adding sufficient cupric phosphate to reduce the infrared reflectivity below 25%.

The white card or canvas on which the sketch is to be painted must reflect 95% of the infrared radiation thereon, and if a black pigment is used with this set of color pigments, it must have an infrared reflectivity of approximately 25%. Carbon black alone absorbs the infrared too strongly, but I have found that carbon black mixed with suitable portions of each of the three-color pigments has absorption characteristics in both the infrared and ultra-violet regions which make it satisfactory for use with these pigments, (in which cupric phosphate is the specific material employed to increase the infrared absorption of the magenta pigment).

As a white base upon which to paint the sketch, I use ordinary Bristol board coated with titanium oxide suspended in cellulose acetate, but any white card or canvas reflecting approximately 95% in the infrared and 35% in the ultra-violet will serve as well with the above pigments.

This embodiment of my invention thus depends on four (or five) coloring materials namely; yellow, magenta, blue-green, and the white support (the fifth which may or may not be desirable, being black).

The accompanying drawing illustrates this embodiment. An "original" picture is made with special pigments as described above and the reflectivity at any point to any particular color is determined by the pigment used to produce that point. The letters R, Y, G, B-G, B, M stand for red, yellow, green, blue-green, blue, and magenta, respectively. Although any number of pigments having the required reflectivities to the various colors and to ultra-violet and infra-red may be used, the simple case of three pigments yellow, blue-green, and magenta serves to illustrate the invention. Green is produced by mixing yellow and blue-green pigment and has ultra-violet and infra-red reflectivities determined by the proportion of pigments used and by their ultra-violet and infra-red reflectivities. For example, a green made up of equal amounts of the above-described yellow and blue-green pigments would have an ultra-violet reflectivity of about 20% and an infra-red reflectivity of about 95%.

Photographing such an original through red, infra-red and ultra-violet filters gives negatives to be used in the usual way for the blue green, magenta and yellow printers respectively. In the drawing the relative densities of the negatives are indicated very roughly by the heights of the shaded areas in the blocks corresponding to the colors of the original.

From the foregoing, it will occur to those skilled in this art that several alternative arrangements may be employed without departing from the spirit of this invention. For example, the ultra-violet reflectivity may be such as to correspond to the green reflectivity instead of the blue reflectivity of the coloring materials used and, correspondingly, the infrared reflectivity would correspond to the blue reflectivity of the coloring materials used. In another case, the infrared or ultra-violet regions may be divided into two portions and the reflectivities within these portions may be controlled to correspond to the green and blue reflectivities respectively or to the reflectivity of any two of the primary colors. This latter case would be particularly useful if, for any reason, it were desirable to also correct the blue-green printer or to utilize an infrared portion of the spectrum for the purpose of making a black printer as disclosed in copending patent application Serial Number 44,125 of Murray. On the other hand and for this same reason, the first described embodiment of the invention is perhaps more useful in connection with three color rather than four color work.

I have found that color separation negatives made up in accordance with my invention require somewhat more contrasty photographic materials and/or longer development than ordinarily used in order to obtain sufficient contrast for photo-mechanical work. Having thus described one palette of colors made up in accordance with my invention and one method of employing these colors, I wish to point out that the invention is not limited to this example but is of the scope of the appended claims.

What I claim and desire to secure by Letters Patent of the United States is:

1. In a photomechanical process employing three subtractive-color inks, the method of producing a corrected color separation negative of an original, which comprises creating the original with coloring materials reflecting the three primary colors and all having ultra violet reflectivities in accordance with and inversely proportional to the amounts of one of the three inks required for their reproduction and exposing a photographic layer only to ultra-violet radiation reflected from the original.

2. In a multi color photo mechanical process employing three subtractive-color inks, the method of producing a corrected color separation negative of an original which comprises creating the original with coloring materials reflecting the three primary colors and all having known infra red reflectivities in accordance with and inversely proportional to the amount of one of the three inks required for their reproduction and exposing a photographic layer only to infrared radiation reflected from the original.

3. The method of producing a corrected color separation negative to be used in making a magenta printing plate, which comprises creating the original with coloring materials reflecting the three primary colors and in which coloring materials predetermined amounts of materials having known infrared reflectivity giving said coloring materials infra-red reflectivities inversely proportional to the amount of magenta tone required for their reproduction have been included and exposing a photographic layer only to infrared radiation reflected from the original.

4. The method of producing a corrected color separation negative to be used in making a yellow printing plate, which comprises creating the original with pigments reflecting the three primary colors and to which pigments, predetermined amounts of materials having known ultra-violet reflectivity have been added giving said pigments ultra-violet reflectivities inversely proportional to the amount of yellow tone required for their reproduction and exposing a sensitive photographic layer only to ultra-violet radiation reflected from the original.

5. In photo mechanical process work using colored inks, the method of making a correctly separated record from a multi-colored original which comprises creating the original with a palette of coloring materials reflecting the three primary colors and in which palette those coloring materials requiring a solid tone of one of the colored inks for their reproduction, relatively highly and equally reflect ultra-violet and in which those which do not require this ink for their reproduction relatively highly and equally absorb ultra-violet and exposing a sensitive photographic layer only to ultra-violet reflected by the original.

6. The method of making a correctly separated record from a multi-colored original for photo mechanical process work, which comprises creating the original with a palette of coloring materials reflecting the three primary colors and in which palette those coloring materials requiring a solid tone of one of the inks for their reproduction reflect infrared equally and substantially more than those not requiring this ink for their reproduction which latter coloring materials absorb infrared uniformly and exposing a sensitive photographic layer only to infrared reflected by the original.

7. In a photo-mechanical process employing at least three subtractive-color printing inks for reproducing a multi-colored original created from artists' coloring materials, the method of producing three color separation images which comprises creating the original with coloring materials reflecting the three primary colors and having ultra violet reflectivities approximately proportional to their reflectivities to one of the primary colors and infra red reflectivities approximately proportional to those of another of the primary colors and exposing three sensitive photographic layers respectively to the third one of the primary colors, to infra red, and to ultra violet radiation from the original.

8. In a photo mechanical process employing three subtractive-color printing inks for reproducing a multi-colored original created from artists' coloring materials reflecting the three primary colors, the method of making three color separation images corrected for the deficiencies of the three inks which comprises incorporating in certain of the artists' coloring materials, such predetermined amounts of materials having known ultra violet reflectivity and incorporating in certain of the artists coloring materials such predetermined amounts of materials having known infra-red reflectivity, that the ultra violet reflectivities of the coloring materials are in accordance with and inversely proportional to the amounts of one of the inks required for the reproduction of the color of these coloring materials and the infra-red reflectivities are in accordance with and inversely proportional to the amounts of another of the inks required for the reproduction, creating the original with said coloring materials and exposing three photographic layers respectively to the infra-red, ultra violet and the primary color corresponding to the third one of the three inks required for the reproduction reflected from the original.

9. The method of making a correctly separated record from a multi-colored original for photo mechanical process work employing at least three colors for reproduction which comprises creating the original with a palette of pigments reflecting the three primary colors and made up from yellow, magenta and blue-green coloring materials, said pigments having ultra-violet reflectivities inversely proportional to the amounts of one of the colors required for their reproduction and infra-red reflectivities inversely proportional to the amounts of another of said colors and exposing a sensitive photographic layer only to one of the two spectral portions, infra-red and ultra-violet, reflected from the original.

10. The method of making a correctly separated record from a multi-colored original for photo mechanical process work, which comprises creating the original with a palette of opaque coloring materials reflecting the three primary colors and made up from yellow, magenta and blue-green pigments, said magenta and blue-green pigments reflecting ultra-violet equally and at least twice as much as said yellow pigment, said yellow and blue-green pigments reflecting infra-red equally and at least twice as much as does the magenta, on a white surface whose infra-red and ultra-violet reflectivities approximate those of the blue-green pigment and exposing a sensitive photographic layer only to one of the portions, infra-red and ultra-violet, of the spectrum reflected by the original.

JOHN A. C. YULE.